United States Patent [19]
Snyder

[11] Patent Number: 5,253,900
[45] Date of Patent: Oct. 19, 1993

[54] CONVERSION ADAPTER FOR AIRBRUSH LIQUID MEDIA RESERVOIR

[76] Inventor: Glenn W. Snyder, 2204 Quail Ridge Dr., Plainsboro, N.J. 08536

[21] Appl. No.: 990,950

[22] Filed: Dec. 14, 1992

Related U.S. Application Data

[63] Continuation of Ser. No. 793,789, Nov. 18, 1991, abandoned.

[51] Int. Cl.⁵ .................. F16L 23/00; F16L 55/00
[52] U.S. Cl. ....................... 285/12; 285/177; 239/302; 239/346
[58] Field of Search .......... 285/12, 175, 176, 177, 285/324; 239/302, 340, 345, 346, 304, 303, 341, 342

[56] References Cited

U.S. PATENT DOCUMENTS

| 658,382 | 9/1900 | Low | 285/177 X |
|---|---|---|---|
| 725,568 | 4/1903 | Johnston | 285/177 X |
| 797,152 | 8/1905 | Sheckler | 285/12 |
| 1,647,245 | 11/1927 | Morrill | 285/177 X |
| 1,871,810 | 8/1932 | Lester | 285/12 X |
| 2,744,791 | 5/1956 | Budwig | 239/340 |
| 2,985,291 | 5/1961 | Schoerpe et al. | 285/177 X |
| 3,082,959 | 3/1963 | Jokelson | 239/346 |
| 3,107,058 | 10/1963 | Corbett | 239/346 |
| 3,587,899 | 6/1971 | Bender | 285/177 X |
| 3,731,954 | 5/1973 | Haglund | 285/12 |
| 4,538,835 | 9/1985 | Sundholm | 285/12 |
| 4,573,712 | 3/1986 | Cameron | 285/12 |
| 4,595,217 | 6/1986 | Siegel | 285/12 X |

Primary Examiner—Eric K. Nicholson

[57] ABSTRACT

A container conversion adapter is disclosed for coupling a reservoir of hand held airbrushes to commercial liquid media containers which permits the user to utilize the commercial container as the airbrush liquid medial reservoir, thus eliminating the need to first transfer the liquid media from a commercial container to a second liquid media reservoir prior to airbrushing.

1 Claim, 4 Drawing Sheets

CONVERSION ADAPTER FOR AIRBRUSH LIQUID MEDIA RESERVOIR

This is a continuation of application Ser. No. 07/793,789, filed Nov. 18, 1991, now abandoned.

FIELD OF INVENTION

A container conversion adapter is disclosed for coupling the reservoir opening of hand held airbrushes to commercial liquid media containers to permit the user to utilize the commercial container as the airbrush liquid media reservoir, thus eliminating the need to first transfer the liquid media from a commercial container to a second liquid media reservoir prior to airbrushing.

BACKGROUND OF THE INVENTION

Airbrushes are most commonly utilized by artists, graphic designers and photographers to apply paint or other liquid media to drawings, paintings, and photographs. They are most proficient for shading, touching-up photographs, and painting models and ceramics. Typical hand held airbrush are a pencil-like instruments that spray liquid media contained in a reservoir in a controlled manner using compressed air or gas as a propellant. In such commercial airbrush assemblies, the liquid media is generally provided in either a funnel type reservoir or a jar type reservoir.

For example, U.S. Pat. No. 4,161,289 to Rebold (1979) discloses a side mounted funnel type reservoir adapted to mount onto the body of the airbrush via a coupling tube. The liquid contained in the funnel type reservoir is gravity-fed through a coupling tube into the main body of the airbrush where it is atomized by means of compressed air or gas passing through the airbrush. The atomized liquid can then be discharged through the nozzle in the form of a spray.

These funnel type reservoirs have disadvantages:

(a) The liquid media can be easily spilled from the funnel requiring the user to keep the airbrush upright when the funnel type reservoir contains media.

(b) when the user is finished with a particular liquid media, the liquid media must be discarded or transferred from the funnel type reservoir back into its original container or into another suitable container. The funnel type reservoir must then be cleaned before loading it with the next liquid media to be used. This is a cumbersome and costly process for professional artists who rely on producing a quantity of work in an expedient manner.

The airbrush disclosed in U.S. Pat. No. 4,171,097 to Rebold (1979) uses a jar type reservoir that is referred to as a "standard size, commercially available glass jar". The jar type reservoir offers a more proficient method of supplying liquid media for airbrushes as it eliminates the need to maintain the airbrush in an upright position to avoid spilling and therefore can be used at steep angles while airbrushing. The jar type reservoir is attached to the main body of the airbrush either directly by coupling the jar directly onto the main body of the airbrush as shown in FIG. 7 or indirectly by coupling the jar to the main body via a coupling tube provided in the lid of the jar as shown in FIG. 6. In both methods, an air inlet hole is provided to prevent creating a vacuum in the jar. In use, compressed air is provided to draw the liquid media up an aspirating tube by venturi effect to atomize the liquid media into small droplets before being sprayed out the nozzle. Since both the direct and indirect configurations utilize a standard size jar type reservoir opening, the jar used for the liquid media reservoir must also fit the standard opening.

Although the benefits of the jar type reservoir outweigh those of the funnel type reservoir, there are still disadvantages:

(a) Airbrush liquid media is most commonly purchased commercially in small, bottle-like containers. Therefore, the liquid media must first be transferred from its original container to a standard size jar in order for it to be used with an airbrush. The user must then discard the unused liquid media or return it to its original container when finished. The standard size jar must then be cleaned before loading the next liquid media to be used similar to the funnel type reservoir. In addition, each time liquid media is transferred from one container to another, a small amount is wasted. Therefore this method is costly as well as cumbersome.

(b) If the user did not wish to clean the jar when changing liquid media he could purchase and use many jars; (i.e. one jar for each liquid media to be used). This would be costly and troublesome.

(c) The air inlet hole can become clogged by the liquid media splashing against the reservoir opening caused by the motion of the liquid media in the reservoir during airbrushing.

Other methods of supplying liquid media to airbrushes are disclosed in U.S. Pat. Nos. 4,508,271 to Gress (1985) and 4,546,922 to Thometz (1985) both of which offer the user the capability of selecting from multiple supply reservoirs containing different liquid media. Although both methods provide the user with multiple liquid media to choose from while airbrushing, there are disadvantages:

(a) The liquid media selection is limited by the number of supply hoses and/or reservoirs.

(b) The user must transfer the airbrush liquid media from the commercial container in which it is purchased to a supply reservoir before airbrushing. The unused portion of liquid media must be returned to its original container or discarded which results in unnecessary waste and inflated cost. The reservoir must then be cleaned before loading the next liquid media to be used.

(c) Both methods involve meticulous and difficult manufacturing processes which result in higher production costs that are usually passed on to the user.

SUMMARY OF INVENTION

It has now been found that the shortcomings and disadvantages of the prior art devices are overcome by the container conversion adapter of the present invention which generally comprises a cylindrical body formed in one piece, as by molding from a suitable plastic material such as Vinylite or machining from solid metal stock such as aluminum. The top portion of the adapter is externally threaded consistent with the size of the standard jar type reservoir opening. The bottom portion of the adapter is internally threaded consistent with the size of the bottle-like container in which airbrush liquid media is most commonly purchased. A narrow internal axial passageway is provided in the adapter concentric to both the top and bottom threaded portions to allow for direct passage of the airbrush aspirating tube. The narrow axial passageway serves to restrict the surface area of the liquid media that may be exposed to the reservoir opening and extend the distance between the surface of the liquid media and the reservoir opening, thereby minimizing the possibility of liquid media splashing against the reservoir opening and clogging the air inlet hole. The top portion of the internal axial passageway is in the form of a parabolic cavity having thin curved walls to prevent blocking the air inlet hole in the reservoir opening. The curved walls serve to drain liquid media back into the reservoir when returning the airbrush to an upright position after being used at tilted angles. The internally threaded bottom portion is fitted with a gasket of resistant material such as rubber, silicone or cork material to eliminate liquid media leaking from the bottle-like container in which the liquid media was purchased and which is used as the liquid media reservoir.

After the conversion adapter is screwed into the standard liquid media reservoir opening, the user simply interchanges the bottles in which the airbrush liquid media is purchased without having to first transfer the liquid media to a standard size jar.

DETAILED DESCRIPTION OF THE INVENTION

The container conversion adapter of the invention will become more clear from the ensuing description when considered together with the accompanying drawings wherein like reference numerals denote like parts and wherein.

DRAWING REFERENCE NUMERALS

Figure 1:
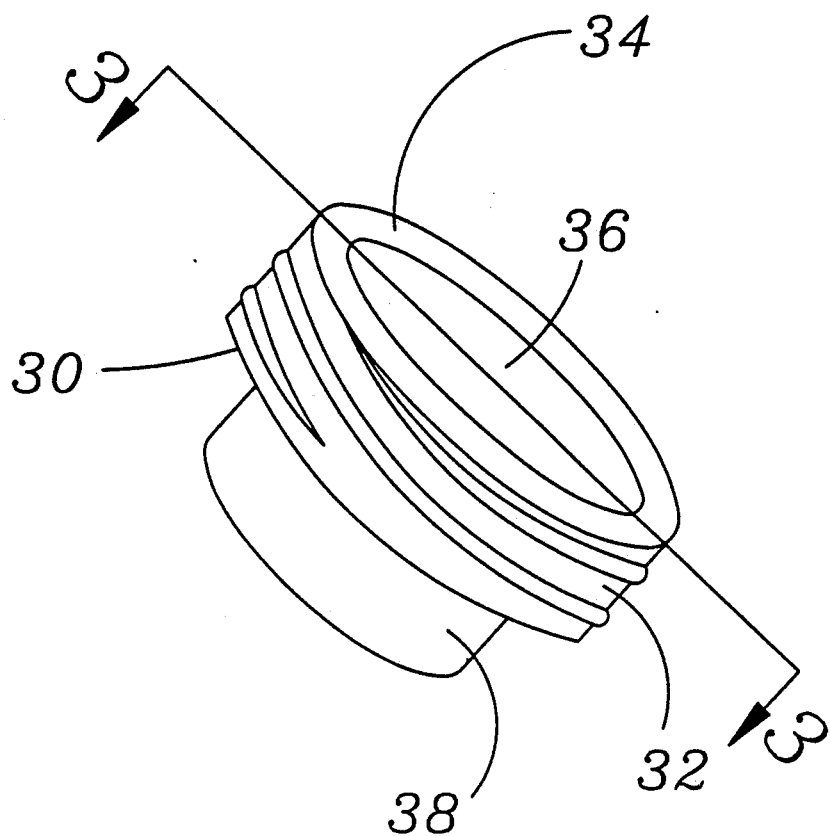
FIG. 1 is a top perspective view of a container conversion adapter of the invention.
Figure 2:
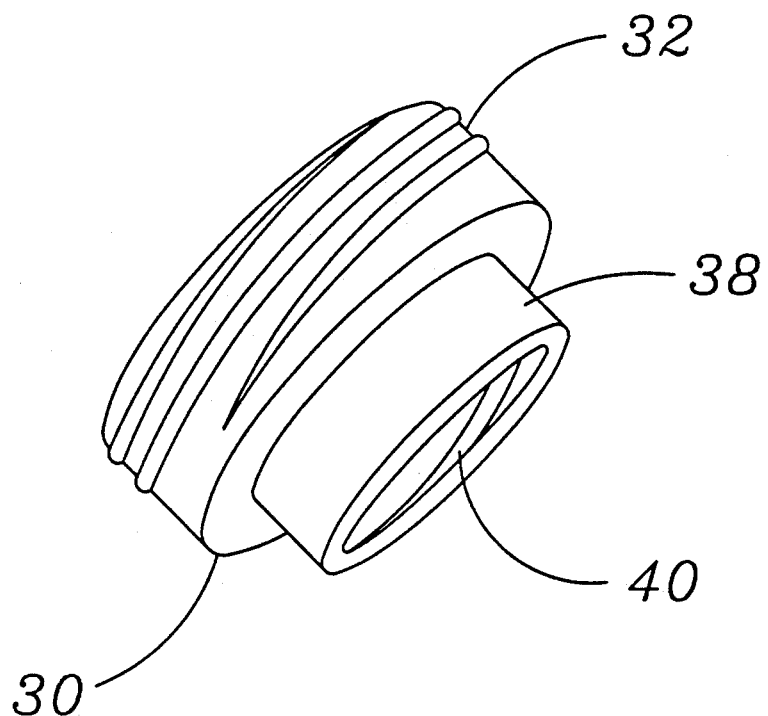
FIG. 2 is a bottom perspective view of the container conversion adapter of the invention.

10: standard size glass jar liquid media reservoir
12: aspirating tube
14: standard size liquid media reservoir opening
16: aspirating tube connection
18: lid for standard size glass jar liquid media reservoir
20: air inlet hole
22: airbrush main body
23: trigger
24: airbrush nozzle
26: pressurized air hose
28: airbrush coupling tube
30: conversion adapter according to the invention
32: externally threaded upper portion of 30
34: top surface of 32
36: curved interior wall of 32
38: internally threaded lower portion of 30
40: internal threads of 38
42: axial passageway between 32 and 38
44: container in which airbrush liquid media is purchased
46: gasket to seal 44
48: airbrush liquid media.

Figure 6:
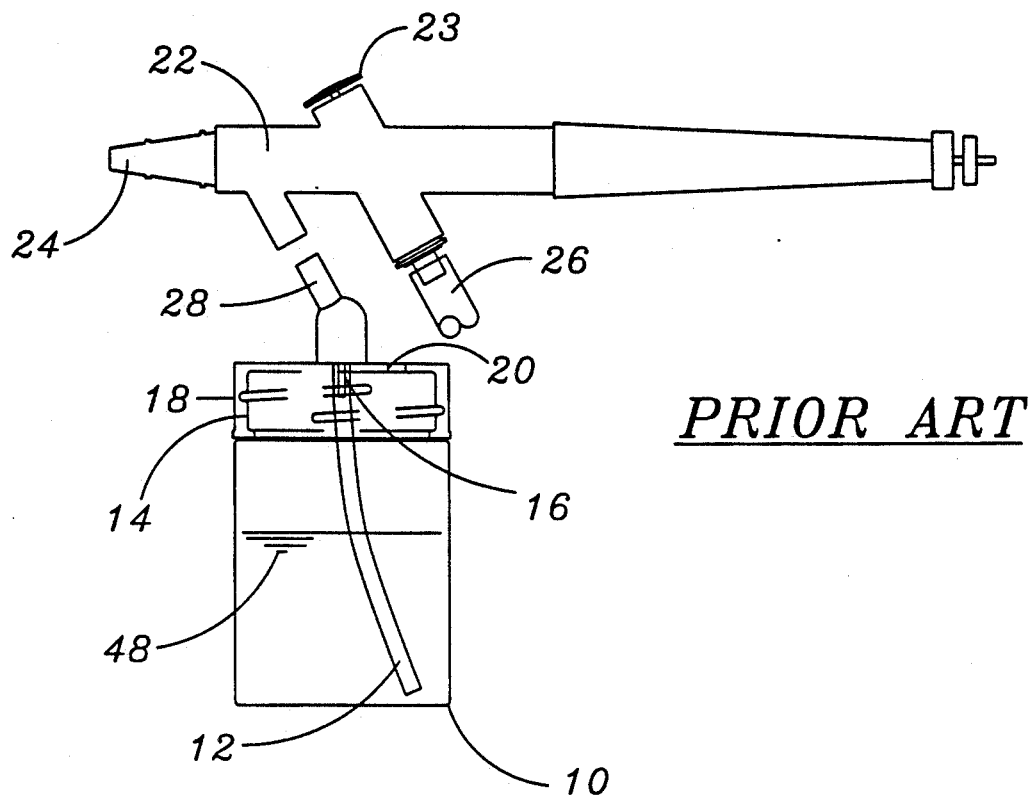
FIG. 6 is an exploded elevation view, part in phantom, of an indirectly coupled jar type liquid media reservoir configured airbrush as described in prior art; and, FIG. 7 is an elevation view, part in phantom, of a directly coupled jar type liquid media reservoir configured airbrush as described in prior art.
Figure 7:
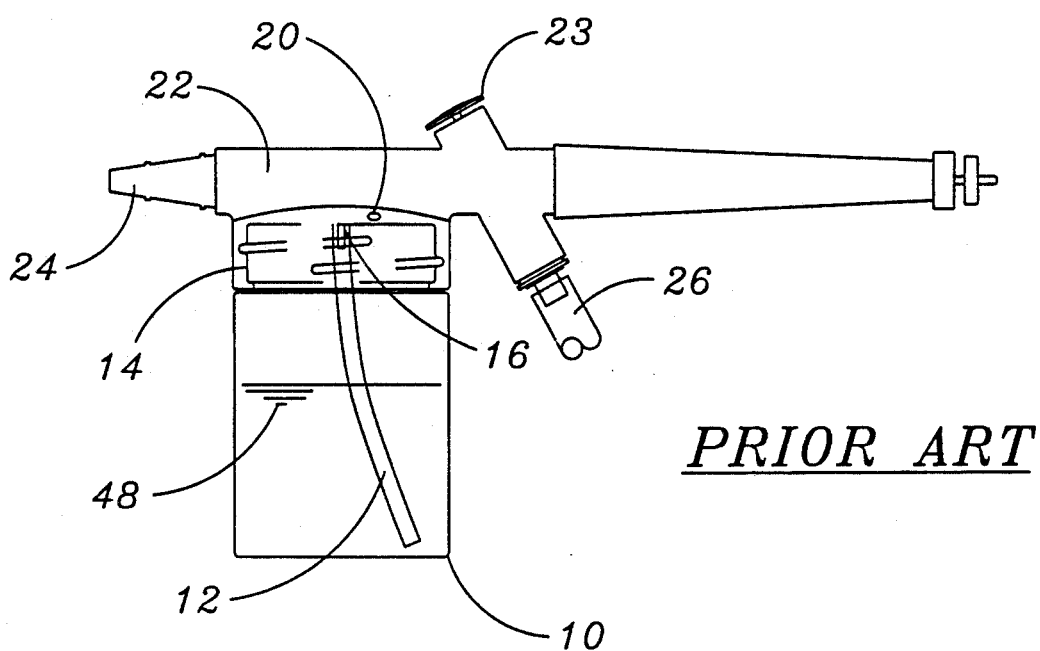

FIGS. 6 and 7 illustrate how prior art uses a standard size glass jar 10 as a liquid media reservoir. The prior art requires the airbrush liquid media 48 to be transferred from the container in which it was purchased to the standard glass jar 10 before being used. This requires the user to discard the unused liquid media 48 or return it to its original container and then clean the glass jar 10 before loading the next liquid media. The user could also purchase a separate standard glass jar 10 for each container of every different liquid media purchased. Therefore, use of the standard glass jar liquid media reservoir is both a cumbersome and costly method.

Figure 3:
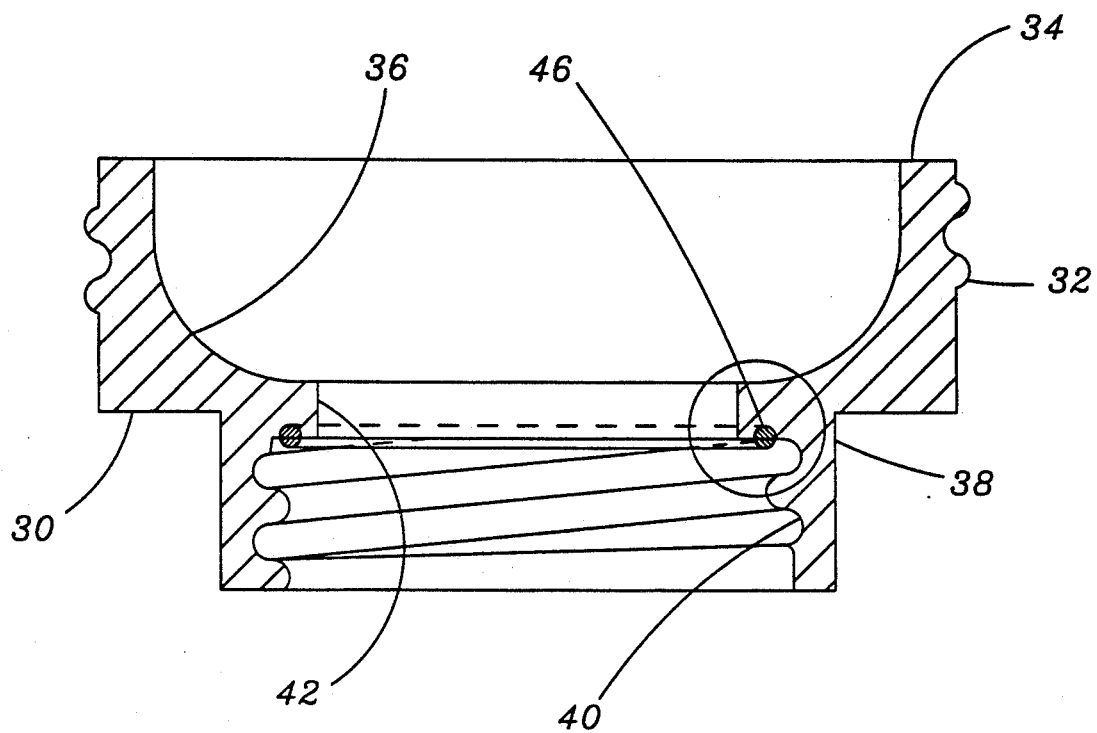
FIG. 3 is a view taken substantially on the line 3—3 of FIG. 1.
Figure 3A:
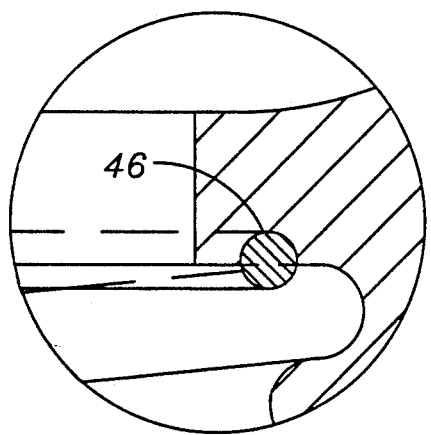
FIG. 3A is an enlarged sectional view of the area circled in FIG. 3.
Figure 4:
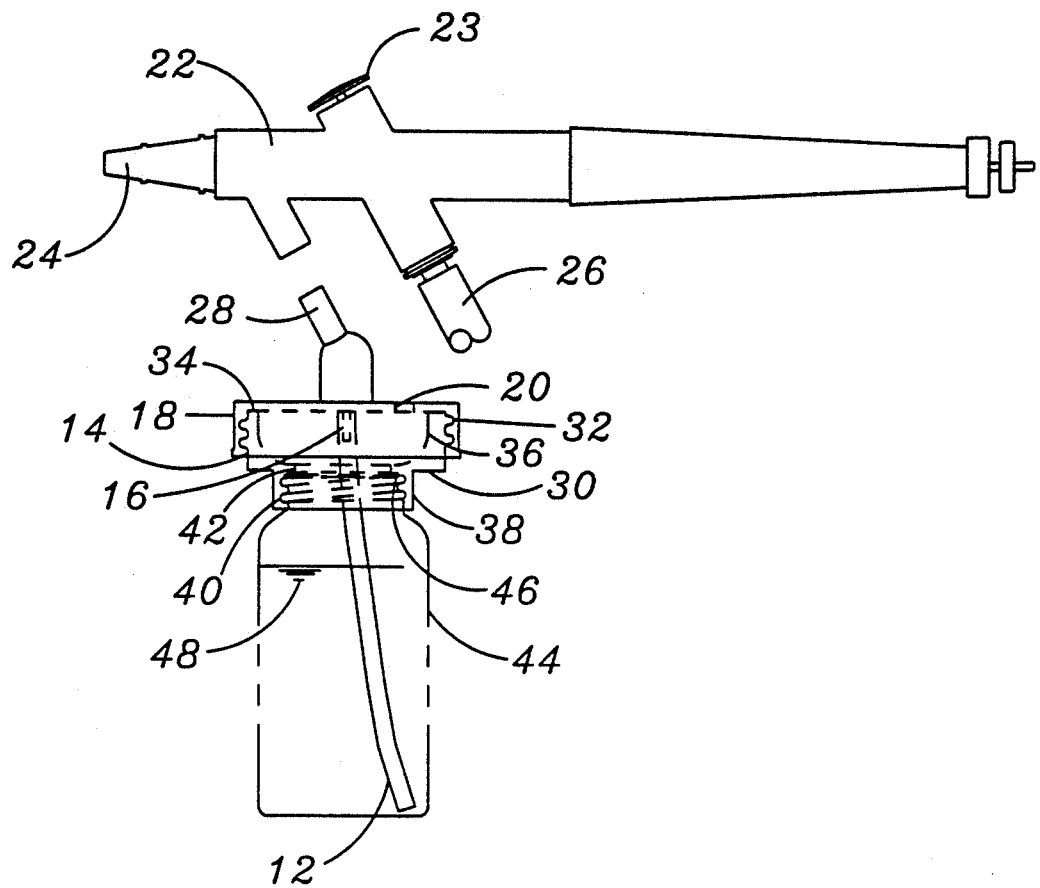
FIG. 4 is an exploded elevation view, part in phantom, illustrating how the adapter of the invention is secured to both the small bottle-like container in which airbrush liquid media is purchased and to an indirectly coupled media reservoir configured airbrush.
Figure 5:
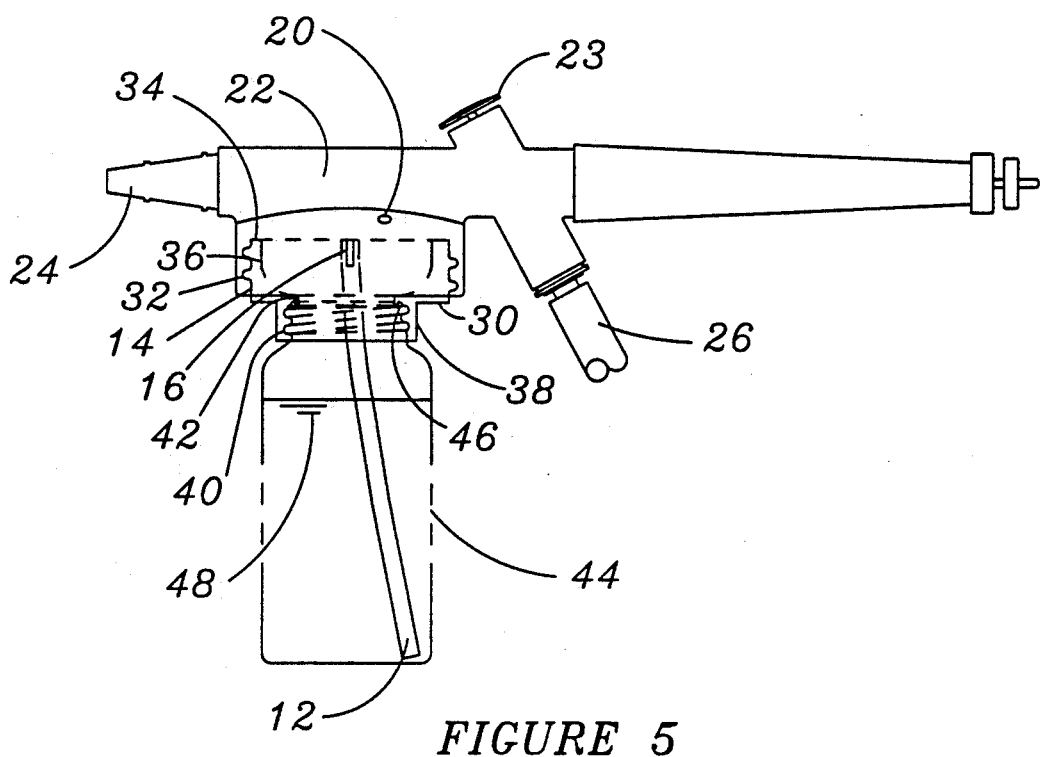
FIG. 5 is an elevation view, part in phantom, illustrating how the adapter of the invention is secured to both the small bottle-like container in which airbrush media is purchased and to a directly coupled media reservoir configured airbrush.

As illustrated in FIGS. 1 through 5, the conversion adapter 30 of the present invention has an externally threaded upper portion 32 and an internally threaded lower portion 38. The externally threaded upper portion 32 is sized to threadably engage a standard size liquid media reservoir opening 14 (FIGS. 4 and 5). The interior wall 36 of the upper portion 32 is curved to minimize the thickness of its top surface 34 so the air inlet hole 20 will not be blocked in neither the liquid media reservoir lid 18 used with indirect media reservoir coupled configurations as shown in FIG. 4, nor in the airbrush main body 22 with directly coupled configurations as shown in FIG. 5. The curved wall 36 also allows the airbrush liquid media 48 to drain back into the airbrush liquid media container 44 when returning the airbrush to an upright position after using it at an extreme tilted angle (FIGS. 4 and 5). The lower portion 38 of the conversion adapter 30 carries internal threads 40 that are sized to threadably receive the container 44 in which airbrush liquid media 48 is typically purchased. Lower portion 38 is fitted with a gasket 46 (FIG. 3 and 3A) that is resistant to liquid media such as rubber, silicone or cork thereby sealing the container 44 when threadably secured to the lower portion 38 of the conversion adapter 30.

To utilize the container conversion adapter of the present invention and alleviate the problems associated with the prior art, the upper portion 32 of the conversion adapter 30 is tightly threaded into the liquid media reservoir opening 14 as shown in FIGS. 4 and 5. The container 44 in which the liquid media was purchased is then tightly threaded into the lower portion 38. The airbrush aspirating tube 12 fits tightly to the hose connection 16 mounted in either the lid 18 for indirectly coupled configurations as shown in FIG. 4, or in the airbrush main body 22 for directly coupled configurations as shown in FIG. 5. The aspirating tube 12 passes from its hose connection 16 through the narrow axial passageway 42 of the conversion adapter 30 into the liquid media 48 in the container 44 in which the liquid media was purchased. When the user presses the trigger 23, compressed air enters the main body 22 of the airbrush through the air supply hose 26. As the compressed air flows through the main body 22, it draws the liquid media 48 up from its container 44 through the aspirating tube 12 and the aspirating tube connection 16 (as well as the coupling tube 28 for indirectly couple configurations, as shown in FIG. 4) into the main body 22 of the airbrush. The compressed air also serves to atomize the liquid media 48 and discharge it out of nozzle 24 in the form of a spray.

Use of the container conversion adapter 30 of the invention permits the user to utilize the containers 44 in which airbrush liquid media are typically purchased as reservoirs, thereby minimizing liquid media application time as well as cost by eliminating the need to purchase a multitude of standard size glass jars 10.

The container conversion adapter 30 of the invention can be formed by molding from a suitable plastics material such as Vinylite or machining from a solid stock material such as aluminum. After molding or machining the conversion adapter 30, a liquid media resistant gasket 46 is fitted around the bottom of the axial passageway 42 inside the internally threaded bottom portion 38 to seal the container 44 used as the liquid media reservoir as shown in FIGS. 3 and 3A.

After attaching the adapter 30 to the jar liquid media reservoir opening 14 of the airbrush, the user can proficiently interchange an unlimited number of liquid media enabling the user to produce a quantity of work in an expedient manner with minimal effort and expense.

What is claimed is:

1. A container conversion adapter for use with an arcuately-threaded airbrush liquid media vessel having an open top surface comprising:
   a. a generally cylindrical monolithic one-piece hollow rigid member having an externally arcuately-threaded portion at one end dimensioned to threadably engage a standard arcuately-threaded airbrush jar liquid media reservoir opening and an internal curved wall at said one end to permit liquid airbrush media to flow back into said arcuately-threaded vessel;
   b. an arcuately-threaded internal axial partial bore at the other end of said rigid member dimensioned to threadably engage said airbrush liquid media arcuately-threaded vessel; and,
   c. an axial bore through said rigid member having a diameter smaller than the diameter of the said internal threaded axial partial bore forming a stop means for preventing further insertion of said arcuately-threaded vessel by contact with said top surface of said arcuately-threaded vessel, said axial bore providing a communicating passage to receive an airbrush aspirating tube into said arcuately-threaded vessel.

* * * * *